UNITED STATES PATENT OFFICE.

HENRY HARRISON ELLIOTT, OF CHARLESTOWN, MASSACHUSETTS.

IMPROVEMENT IN THE MODES OF REMOVING STAINS FROM MARBLE AND OTHER STONES.

Specification forming part of Letters Patent No. 147,250, dated February 10, 1874; application filed December 5, 1873.

*To all whom it may concern:*

Be it known that I, HENRY HARRISON ELLIOTT, of Charlestown, Middlesex county, State of Massachusetts, have invented a new and Improved Mode of Removing Stains from Marble, Alabaster, and other Stones, of which the following is a specification:

Marble table-slabs and marble counters are occasionally stained with spots of ink, oils of various kinds, animal, vegetable, and mineral, and other defacing marks; monuments are stained with substances dropped in watery solution from certain trees; door-steps and building foundations are stained with tobacco-juice, and with, especially at the corners of the buildings, canine urinary secretions, &c.; and new stones are frequently defaced with iron rust, &c. The object of my invention is to remove these defacements.

I take one pound commercial chloride of lime, two ounces spirits of turpentine, and one ounce spirits of ammonia, and mix these ingredients thoroughly, thus making a paste of them. Then, taking my slab of marble, I spread this paste upon the surface or part to be cleaned to the thickness of from three-eighths to one-half an inch. I then expose this prepared slab to the action of steam heat for a period varying from twenty minutes to an hour, more or less, the time of exposure varying according to the supposed nature of the stains, and the probable time during which they have been present in the stone. The staining substances which require the least time are such common stains as are likely to be present on a table-slab or counters, mantle-pieces and statuary, as of ink, various liquid drugs and medicines, tobacco, &c. Those which require the longest time are stains of oils, animal, vegetable, and mineral; marks from the watery extract of black-walnut shavings, (used carelessly in packing the stone;) iron rust from vessels carelessly left in a moist condition on marble slabs, or from the saws used in sawing up the marble; also, the stains from claret, port, and other wines, (these latter are of course most common on table-slabs and counters;) also, those stains seen about the marble bases of soda-fountains, coming from the extracts and sirups used in flavoring. In most cases no other manipulation is necessary but the simple administration of cold water, applied with a brush, to remove the coating of chemicals now holding the extracted substances; but, in other cases, as when the stains have resulted from the presence of oil, I use alcohol of ordinary commercial strength, say, eighty degrees, with which, after the aqueous washing is concluded, I wash the surface to be cleaned. Some species of oils, as, for instance, fish-oils, (shed upon the marble counter-slabs, in fish-markets, on which fish have been cut up,) contain a dyeing or coloring substance, most readily removed after my first-mentioned ingredients have been applied (without the use of alcohol) by a watery solution of oxalic acid, made in the proportion of, say, two ounces of crystals dissolved in a quart of cold water. This I apply preferably with a cloth, and, wetting the stone thoroughly with it, allow the solution to remain on the marble a few moments, and then wash the same off with cold water.

I do not confine myself to the exact proportion of these substances named, but prefer those I have mentioned; nor do I always use lime as an alkaline base for my chlorine. I use sometimes chloride or hypochlorite of soda, or chloride or hypochlorite of potash.

I claim—

The composition for cleaning marble, alabaster, and other stones, consisting of chlorine united with an alkaline base, spirits of turpentine, and spirits of ammonia applied and treated by steam, substantially in the manner described.

Boston, November 24, 1873.

HENRY HARRISON ELLIOTT.

Witnesses:
LEMUEL P. JENKS,
F. H. BOWERS.